US011624519B2

(12) United States Patent
Eubanks et al.

(10) Patent No.: US 11,624,519 B2
(45) Date of Patent: Apr. 11, 2023

(54) CARBON MONOXIDE PURGE SYSTEM FOR A PROPERTY

(71) Applicant: ObjectVideo Labs, LLC, Tysons, VA (US)

(72) Inventors: Dana Eubanks, Tysons, VA (US); Andrew Scanlon, Falls Church, VA (US); Donald Madden, Columbia, MD (US)

(73) Assignee: Object Video Labs, LLC, Tysons, VA (US)

( * ) Notice: Subject to any disclaimer, the term of this patent is extended or adjusted under 35 U.S.C. 154(b) by 563 days.

(21) Appl. No.: 16/737,124

(22) Filed: Jan. 8, 2020

(65) Prior Publication Data

US 2020/0224899 A1 Jul. 16, 2020

Related U.S. Application Data

(60) Provisional application No. 62/790,521, filed on Jan. 10, 2019.

(51) Int. Cl.
*F24F 11/00* (2018.01)
*F24F 11/33* (2018.01)
(Continued)

(52) U.S. Cl.
CPC .......... *F24F 11/0001* (2013.01); *F24F 11/33* (2018.01); *F24F 11/64* (2018.01);
(Continued)

(58) Field of Classification Search
CPC ........ F24F 11/0001; F24F 11/33; F24F 11/59; F24F 11/64; F24F 2011/0002; F24F 2110/52; F24F 2110/72
(Continued)

(56) References Cited

U.S. PATENT DOCUMENTS

| 5,576,739 | A | 11/1996 | Murphy |
| 7,005,994 | B2 * | 2/2006 | King .................... G08B 29/183 340/506 |

(Continued)

FOREIGN PATENT DOCUMENTS

JP  2018-071903  5/2018

OTHER PUBLICATIONS

International Search Report and Written Opinion in International Application No. PCT/US2020/012717, dated Apr. 2, 2020, 10 pages.

(Continued)

*Primary Examiner* — Avinash A Savani
*Assistant Examiner* — Dana K Tighe
(74) *Attorney, Agent, or Firm* — Fish & Richardson P.C.

(57) ABSTRACT

Methods, systems, and apparatus, including computer programs encoded on a computer storage medium, purging carbon monoxide (CO) from within a property. The methods, systems, and apparatus include actions of obtaining a reading from a carbon monoxide sensor in a property, determining that carbon monoxide in a property satisfies a carbon monoxide criteria based on the reading from the carbon monoxide sensor, obtaining a reading from a fire sensor, determining that a fire is not in the property based on the reading from the fire sensor, and in response to determining that carbon monoxide in the property satisfies the carbon monoxide criteria and that a fire is not in the property, triggering air in the property to be vented outside the property.

18 Claims, 4 Drawing Sheets (51) Int. Cl.
*F24F 11/64* (2018.01)
*F24F 110/72* (2018.01)
*F24F 11/59* (2018.01)
*F24F 110/52* (2018.01)

(52) U.S. Cl.
CPC ....... *F24F 11/59* (2018.01); *F24F 2011/0002* (2013.01); *F24F 2110/52* (2018.01); *F24F 2110/72* (2018.01)

(58) Field of Classification Search
USPC ........................................................ 454/239
See application file for complete search history.

(56) References Cited

U.S. PATENT DOCUMENTS

| | | | |
|---|---|---|---|
| 7,683,794 B2 | 3/2010 | Contreras | |
| 7,934,411 B2 | 5/2011 | Koch | |
| 9,196,146 B1* | 11/2015 | Vicente | G08B 21/14 |
| 9,513,898 B2 | 12/2016 | Solnit et al. | |
| 2002/0044061 A1 | 4/2002 | Johnston et al. | |
| 2003/0087600 A1 | 5/2003 | Meneely, Jr. | |
| 2005/0078003 A1 | 4/2005 | King | |
| 2007/0146150 A1* | 6/2007 | Calabrese | G08B 21/14 |
| | | | 340/628 |
| 2017/0146964 A1 | 5/2017 | Beals | |
| 2018/0264299 A1 | 9/2018 | Combe | |
| 2019/0195523 A1* | 6/2019 | Mowris | F24F 11/77 |
| 2020/0191081 A1* | 6/2020 | Hughes | F02D 41/042 |

OTHER PUBLICATIONS

Canadian Centre for Occupational Health, "Carbon Monoxide," Canadian Centre for Occupational Health and Safety, Feb. 10, 2013, www.ccohs.ca/oshanswers/chemicals/chem_profiles/carbon_monoxide.html, 8 pages.

EP Extended European Search Report in European Appln. No. 20738597.2, dated Aug. 16, 2022, 8 pages.

* cited by examiner

CARBON MONOXIDE PURGE SYSTEM FOR A PROPERTY

CROSS-REFERENCE TO RELATED APPLICATIONS

This application claims the benefit of U.S. Provisional Application No. 62/790,521, filed Jan. 10, 2019, which is incorporated by reference in its entirety.

TECHNICAL FIELD

This disclosure relates to property monitoring technology.

BACKGROUND

Many people equip homes and businesses with monitoring systems to provide increased security for their homes and businesses. In these same homes and businesses heating, venting, and air conditioning (HVAC) systems are commonly used.

SUMMARY

Techniques are described for purging carbon monoxide (CO) from within a property. In some implementations, a CO purge system may take advantage of both sensors of a monitoring system of a property and a HVAC system within the property. The CO purge system may use both to reduce high levels of CO from within the property. For example, a residential property may use the CO purge system to reduce CO levels from the residential property from an unsafe level to a safe level.

Generally, the CO level within a property may be reduced by venting air from within the property to outside the property. Venting air from within the property to outside results in air from outside the property being drawn into the property, so CO laden air from inside the property may be replaced with fresh air from outside. However, sometimes venting air from within the property to outside the property may actually be harmful. For example, CO may be due to a fire within the property and venting air with low oxygen outside and drawing air with high oxygen inside may result in the fire growing larger.

Accordingly, the CO purge system may determine whether CO levels in a property satisfy CO criteria and whether a fire is in the property, and if both CO levels in the property satisfy CO criteria and a fire is not in the property, then vent air outside and otherwise not vent air outside. In some implementations, the CO purge system may use an existing HVAC system to vent air outside. Additionally or alternatively, the property may include a CO diversion duct and a fresh air feed duct, and the CO purge system may use the CO diversion duct to expel air with high levels of CO from within the property and use the fresh air feed duct to intake air with low levels of CO from outside the property.

In some implementations, the CO purge system may take other factors into consideration in determining whether to intake air from outside the property. For example, the CO purge system may determine from a reading from a CO sensor outside the property that the CO in air outside the property is actually greater than the CO in air inside the property and, in response, determine not to vent air outside. In another example, the CO purge system may determine that a fire is compartmentalized from a room where a person is and air from outside the property can be provided to the room without providing the air to the fire and, in response, determine to vent air.

In some implementations, the CO purge system may also reduce the amount of CO generated within the property. For example, in response to determining that the amount of CO in the property satisfies a CO criteria, the CO purge system may selectively disable and enable heating systems, bathroom vents, stoves, cooking appliances, water heaters, etc., to determine the source of the CO and mitigate it if possible.

In general, one innovative aspect of the subject matter described in this specification can be embodied in a method for purging carbon monoxide from within a property. The method includes obtaining a reading from a carbon monoxide sensor in a property, determining that carbon monoxide in a property satisfies a carbon monoxide criteria based on the reading from the carbon monoxide sensor, obtaining a reading from a fire sensor, determining that a fire is not in the property based on the reading from the fire sensor, and in response to determining that carbon monoxide in the property satisfies the carbon monoxide criteria and that a fire is not in the property, triggering air in the property to be vented outside the property.

Other embodiments of this aspect include corresponding circuitry, computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. In some aspects, obtaining a reading from a fire sensor includes in response to determining that carbon monoxide in the property satisfies the carbon monoxide criteria, providing a request to the fire sensor for a status and receiving the reading from the fire sensor in response to the request.

In certain aspects, obtaining a reading from a fire sensor includes receiving the reading from the fire sensor before determining that carbon monoxide in the property satisfies the carbon monoxide criteria. In some implementations, determining that a fire is not in the property includes determining that the reading indicates that no current fire was detected by the fire sensor. In some aspects, triggering air in the property to be vented outside the property includes determining that a second reading, from a second carbon monoxide sensor outside the property that includes the fire sensor, indicates that a concentration of carbon monoxide outside the building is lower than the concentration of carbon monoxide inside the property, where the property includes a building, and where triggering air in the property to be vented outside the property is in response to determining that the second reading indicates that the concentration of carbon monoxide outside the building is lower than the concentration of carbon monoxide inside the building.

In some implementations, determining that a second reading, from a second carbon monoxide sensor outside a building that includes the fire sensor, indicates that a concentration of carbon monoxide outside the building is lower than the concentration of carbon monoxide inside the building includes in response to determining that carbon monoxide in the property satisfies the carbon monoxide criteria and that a fire is not in the property, providing a request to the second carbon monoxide sensor for a status and receiving the second reading from the second carbon monoxide sensor in response to the request.

In certain aspects, obtaining a reading from a carbon monoxide sensor in a property includes obtaining, at a control unit in the property, an indication of a particular carbon monoxide concentration detected by the carbon monoxide sensor. In some aspects, determining that carbon monoxide in a property satisfies a carbon monoxide criteria includes determining that the concentration detected by the carbon monoxide sensor is above a particular safety threshold. In some implementations, triggering air in the property to be vented outside the property includes providing an instruction to a heating, venting, and air conditioning (HVAC) system in the property that instructs the HVAC system to vent air outside the property.

In certain aspects, triggering air in the property to be vented outside the property includes determining a path to vent carbon monoxide through the property and controlling vents in the property based on the path that was determined. In some implementations, actions include obtaining a second reading from a second carbon monoxide sensor that is closer to a combustion appliance than the carbon monoxide sensor, determining that the combustion appliance is likely producing carbon monoxide based on the first reading and the second reading, and in response to determining that the combustion appliance is likely producing carbon monoxide based on the first reading and the second reading, deactivating the combustion appliance.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
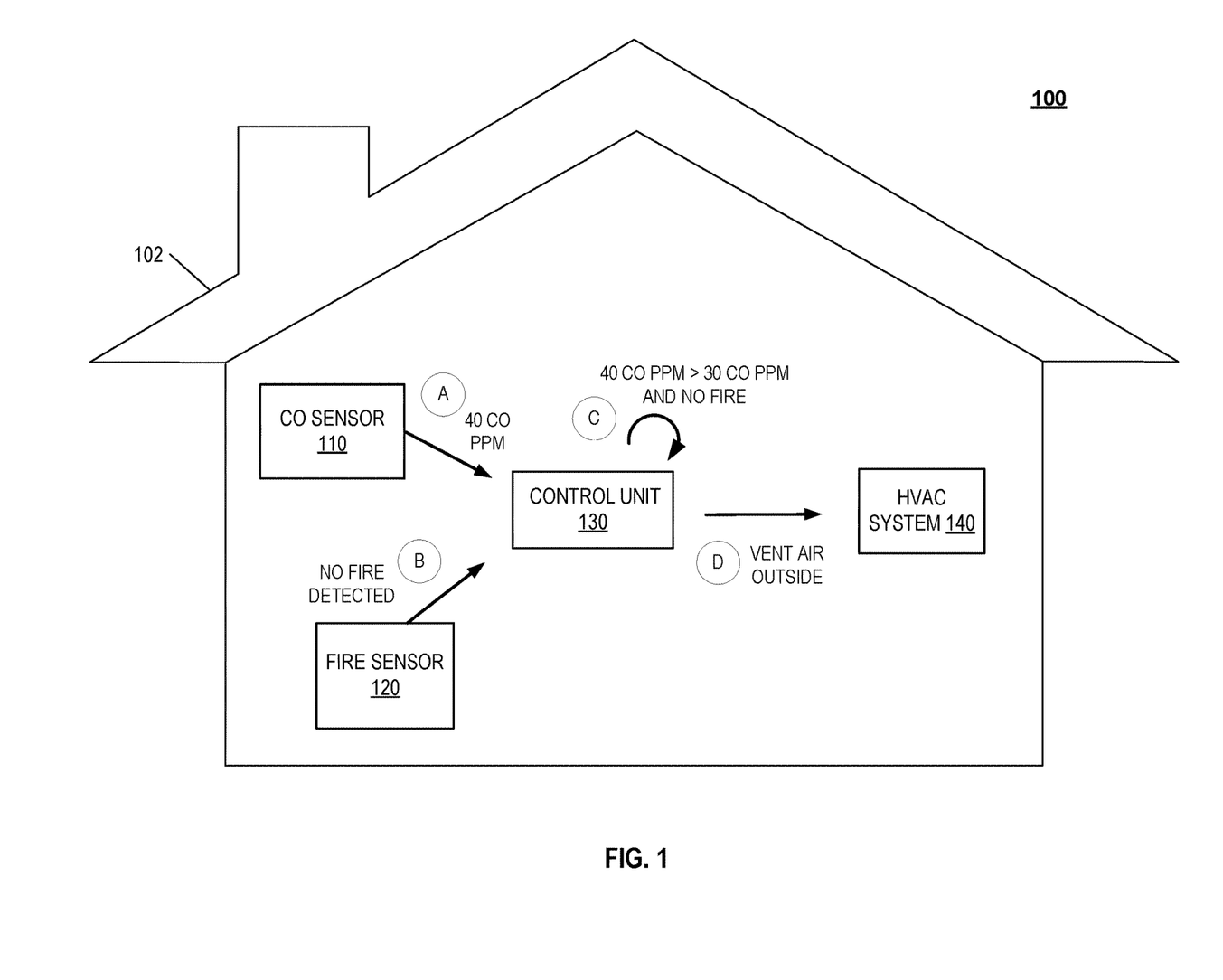
FIG. 1 illustrates an example of a system for purging CO from within a property.

FIG. 1 illustrates an example of a system 100 for purging CO from within a property 102. As shown in FIG. 1, the system 100 may include a property 102 (e.g. a home) of a user that is monitored, a CO sensor 110, a fire sensor 120, a control unit 130, and a HVAC system 140.

The CO sensor 110 may be a sensor that is configured to sense CO within air and provide a reading of the amount of CO sensed in the air. For example, there may be forty parts per million (PPM) of CO within the air in the property 102 and the CO sensor 110 may sense the CO and transmit to the control unit 130 a reading of "Forty CO PPM." In another example, there may be fifty parts per million (PPM) of CO within the air in the property 102 and the CO sensor 110 may sense the CO and transmit to the control unit 130 a reading of "Fifty PPM."

The fire sensor 120 may be a sensor that is configured to sense fire. For example, the fire sensor 120 sensor may sense fire and, in response, provide a reading of "Fire detected" to the control unit 130. In another example, the fire sensor 120 sensor may not sense fire and, in response, provide a reading of "No fire detected" to the control unit 130. In some implementations, the fire sensor 120 may sense fire based on sensing smoke. For example, the fire sensor 120 may be a smoke detector that is configured to detect when an amount of smoke in air is greater than or equal to an amount of smoke that corresponds to a fire and, in response to detecting that amount, provide a reading of "Fire detected" and otherwise provide a reading of "No fire detected."

In some implementations, the fire sensor 120 may be a heat sensor that is configured to sense when heat satisfies a heat threshold that corresponds to a fire. For example, the fire sensor 120 may sense heat in the amount of four hundred and fifty degrees Fahrenheit, determine that the sensed amount satisfies a heat threshold of four hundred, and, in response, provide a reading of "Fire detected" and otherwise provide a reading of "No fire detected." Additionally or alternatively, the fire sensor 120 may include a camera and sense fire based on heavy smoke in the video or an appearance of fire in the video, include a water flow sensor and sense fire in response to sensing water flowing from a sprinkler determine there is fire, or include an infra-red sensor and sense fire in response to detecting a signature of fire in the sensed infra-red.

The control unit 130 may receive readings from the CO sensor 110 and fire sensor 120 and determine whether to instruct HVAC system 140 to vent air outside. The control unit 130 may determine whether to instruct HVAC system 140 to vent air outside based on determining whether the reading from the CO sensor 110 satisfies a CO criteria and determining whether the reading from the fire sensor 120 indicates a fire was detected.

For example, the control unit 130 may receive a reading from the CO sensor 110 that indicates forty CO PPM and a reading from the fire sensor 120 that indicates no fire detected within the property 102, in response, determine that the reading of forty CO PPM satisfies a CO criteria of thirty CO PPM and the reading of no fire detected indicates no fire was detected, and, in response, provide an instruction to the HVAC system 140 to vent air from inside the property 102 to outside the property 102. Accordingly, the amount of CO in the property 102 may be reduced by the HVAC system 140 venting air outside.

In another example, the control unit 130 may receive a reading from the CO sensor 110 that indicates ten CO PPM and a reading from the fire sensor 120 that indicates no fire detected within the property 102 and, in response, not provide an instruction to the HVAC system 140 to vent air from inside the property 102 to outside the property 102. Accordingly, the amount of CO in the property 102 may not be decreased by the HVAC system 140.

In yet another example, the control unit 130 may receive a reading from the CO sensor 110 that indicates forty CO PPM and a reading from the fire sensor 120 that indicates a fire was detected within the property 102 and, in response, not provide an instruction to the HVAC system 140 to vent air from inside the property 102 to outside the property 102. Accordingly, the air from outside may be prevented from being drawn in and used as an oxygen source for the fire within the property 102.

The CO criteria may be a criteria that is satisfied to determine to vent air outside. For example, the CO criteria may be CO PPM being greater than thirty PPM. In another example, the CO criteria may be CO PPM being greater than or equal to thirty PPM. In yet another example, the CO criteria may be CO PPM being greater than forty PPM.

Figure 2:
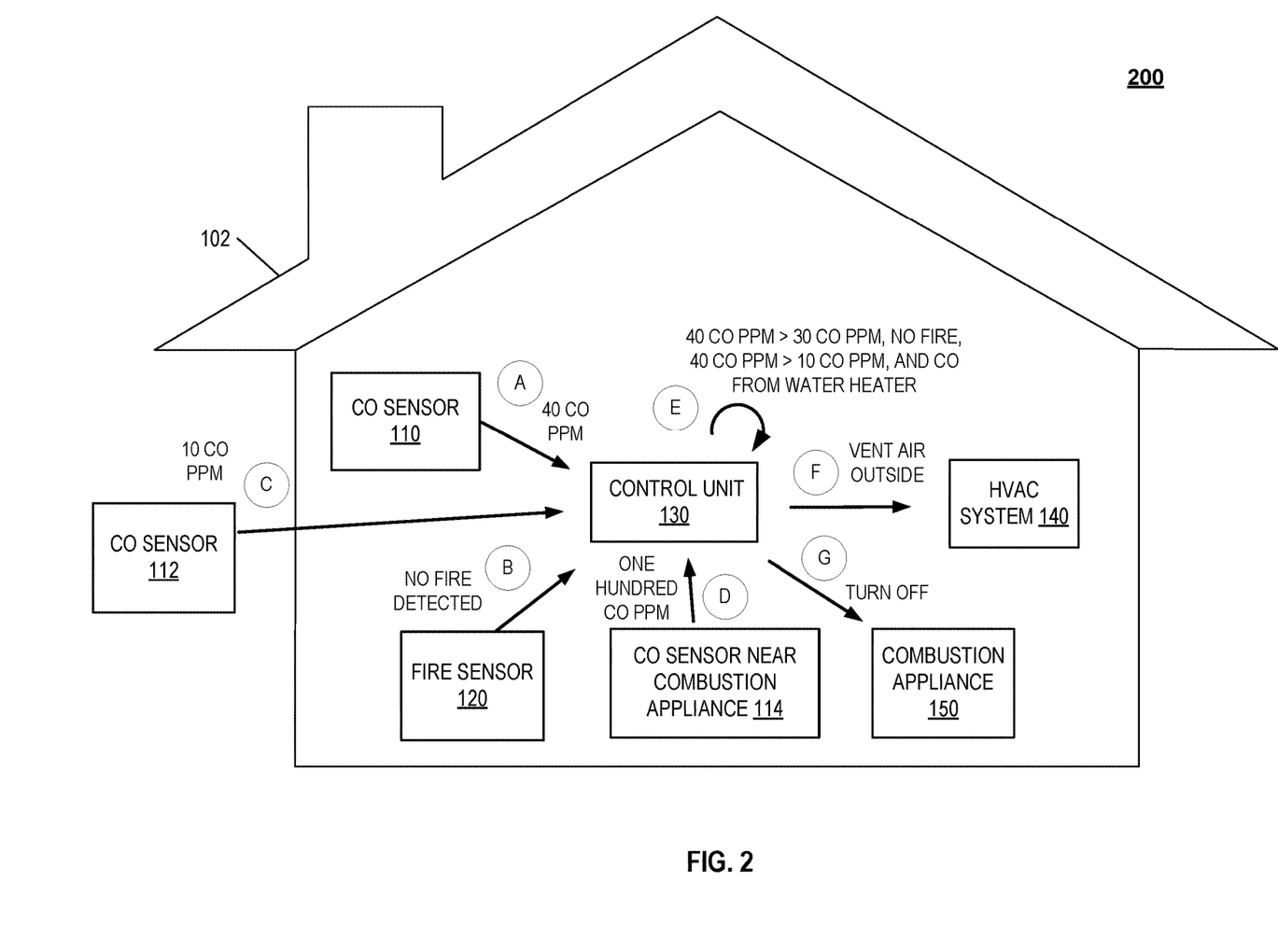
FIG. 2 illustrates an example of another system for purging CO from within a property

In some implementations, the control unit 130 may take other factors into consider when determining whether to instruct the HVAC system 140 to vent air outside, as described in more detail in FIG. 2. Additionally or alternatively, in some implementations as described in more detail in FIG. 2, the control unit 130 may trigger combustion appliances within the property 102 to turn off to stop a source of CO from producing more CO.

The HVAC system 140 may provide heating, ventilation, and air conditioning within the property 102. For example, the HVAC system 140 may include air ducts, fans, a heater, bathroom vents, powered HVAC vents and an air conditioner. The HVAC system 140 may receive instructions from the control unit 130 and perform actions in response to the instructions. For example, the HVAC system 140 may receive an instruction to vent air outside or turn on a set of fans and, in response, turn on the set of fans that push air from inside the property 102 to outside the property 102.

Accordingly, in one example as shown in FIG. 1, the CO sensor 110 may provide a reading that indicates forty CO PPM was sensed (A), the fire sensor 120 may provide a reading that indicates that no fire was detected (B), the control unit 130 may determine that forty CO PPM is greater than thirty CO PPM and no fire was detected, and the control unit 130 may instruct the HVAC system 140 to vent air outside.

Different configurations of the system 100 may be used where functionality of the CO sensor 110, the fire sensor 120, the control unit 130, and the HVAC system 140 may be combined, further separated, distributed, or interchanged. For example, instead of the fire sensor 120 determining whether a fire is in the property 102, the fire sensor 120 may provide a reading for the control unit 130 to classify whether a fire is within the property 102. In a specific example, the control unit 130 may determine whether there is a fire in the property 102 based on an amount of heat sensed indicated by the fire sensor 120 or video captured by the fire sensor 120.

In another example of a different configuration of the system 100, the system 100 may include a monitoring server outside the property 102 in communication with the control unit 130 within the property 102. The monitoring server may receive the readings from the control unit 130, determine whether the CO satisfies the CO criteria, and, in response transmit an alert that CO is high in the property 102 to a mobile computing device of a user of the system 100, e.g., the smart phone of the owner of the property 102, and transmit an instruction to the control unit 130 that triggers the control unit 130 to instruct the HVAC system 140 to vent air outside. The monitoring server may also transmit an alert to the mobile computing device of the user of the system 100 to indicate when CO has returned to normal safe amounts in the property 102.

FIG. 2 illustrates an example of another system 200 for purging CO from within a property. The system 200 may be similar to the system 100 but show how the control unit 130 may take into account different factors to determine whether to vent air outside, and may also trigger combustion appliances in the property 102 to turn on and off.

For example, as shown in FIG. 2, a control unit 130 may receive readings from the CO sensor 110, a second CO sensor 112, a third CO sensor 114, and the fire sensor 120 that indicate forty CO PPM in a room, ten CO PPM outside, one hundred CO PPM near a combustion appliance, and no fire detected in the property 102. The control unit 130 may determine that forty CO PPM from the reading is higher than a threshold of thirty CO PPM, forty CO PPM indoors is higher than ten CO PPM outdoors, and there is no fire in the property 102, and, in response, determine to vent air outside. Additionally, the control unit 130 may determine that one hundred CO PPM from near a combustion appliance 150 is the highest CO reading from a CO sensor in the property 102 and, in response, trigger the combustion appliance 150 to turn off.

The second CO sensor 112 may be located outside the property 102 near where air would be drawn into the property when air is vented outside, e.g., near a fresh air intake duct, and provide readings of CO in air to the control unit 130. For example, the second CO sensor 112 may provide a reading of ten CO PPM for air that could be drawn into the property 102.

The third CO sensor 114 may be near the combustion appliance 150. For example, the third CO sensor 114 may provide a reading of one hundred CO PPM for air near the combustion appliance 150, and the higher CO reading from the third CO sensor 114 compared to the CO sensor 110 may indicate that the combustion appliance is the source of the CO. The combustion appliance 150 may be an appliance that combusts material. For example, the combustion appliance may be one or more of gas/wood/oil heating systems, stoves or fireplace inserts, cooking appliances, or hot water heaters.

The control unit 130 may obtain a CO reading from the second CO sensor 112, determine whether the CO reading from the second CO sensor 112 is lower than the CO reading from the CO sensor 110, and, if the CO reading from the second CO sensor 112 is not lower than the CO reading from the CO sensor 110, determine not to vent air outside. For example, the control unit 130 may determine that a reading from the second CO sensor 112 indicates fifty CO PPM in air outside, fifty CO PPM is higher than forty CO PPM from the CO sensor 110, and, in response, determine not to vent air outside regardless of any other factors because venting air outside may actually increase CO inside the property 102 as air with more CO than inside would be drawn into the property 102. CO may be greater outside the property 102 than inside the property 102 when there is a fire outside the property 102 or a vehicle or machinery running outside the property.

Besides instructing the HVAC system 140 to vent air outside, the control unit 130 may additionally or alternatively trigger a combustion appliance 150 to turn off. For example, the control unit 130 may determine that the reading from the third CO sensor 114 near the combustion appliance 150 indicates a reading of one hundred CO PPM, the reading is higher than any reading from any other CO sensor within the property 102, and, in response, determine that the combustion appliance 150 is likely the source of the CO and send an instruction to the combustion appliance 150 to turn off or an instruction to a valve that controls a flow of fuel to the combustion appliance 150 to stop providing fuel.

In another more conservative example, the control unit 130 may determine that a reading from the CO sensor 110 indicates forty CO PPM which is above thirty CO PPM and, in response, trigger all combustion appliances in the property 102 to turn off so that additional CO should stop being produced in the property 102. In some implementations, if the control unit 130 determines that a CO reading from the CO sensor 110 satisfies a CO critical criteria, the control unit 130 may instruct all combustion appliances within the property 102 to turn off. For example, the control unit 130 may initially only turn off one combustion appliance but the CO may continue to rise such that the control unit 130 then determines that a CO reading is at one hundred PPM which is at or above a threshold of one hundred PPM and, in response, shut off any gas/wood/oil heating systems, stoves or fireplace inserts, cooking appliances, or hot water heaters within the property 102.

Additionally or alternatively, the control unit 130 may determine whether to vent air outside based on determining whether a vehicle or machinery is running outside the property, and not vent air when a vehicle or machinery is determined to be running outside the property. For example, the control unit 130 may obtain video or sound recorded from near a fresh air intake vent and determine using visual object recognition or sound signature identification whether a vehicle or machinery is running outside the property. In this circumstance the control unit 130 may trigger the HVAC system 140 to turn off.

In some implementations, the control unit 130 may identify kitchen or bathroom vent fans that may lower CO in the property 102. For example, the control unit 130 may determine that a particular set of kitchen and bathroom vent fans constitutes the most direct path to move CO outside without creating higher CO concentrations in areas occupied by a person and, in response, turn on the set of vent fans.

In some implementations, the control unit 130 may use audio, temperature, or infra-red imaging sensors to locate CO sources inside the property 102. For example, a heater might raise the temperature of one room above average or show up as hot on an infrared image, while an internal combustion engine may have a distinctive audio signature.

In some implementations, the control unit 130 may determine a vehicle or other source of CO is in a garage or CO is high in the garage, there is no fire in the garage, and, in response, instruct the garage doors to open to ventilate the CO from inside the garage to outside. In some implementations, the control unit 130 may query a vehicle integrated with a monitoring system of the property 102 to request a running state and location to determine whether the vehicle is the CO source. For example, if the control unit 130 receives a response from a vehicle that indicates the vehicle is running and at the property 102, then the control unit 130 may determine that the vehicle is likely to be the CO source. In another example, if the control unit 130 receives a response from a vehicle that indicates the vehicle is not running or not at the property 102, then the control unit 130 may determine that the vehicle is unlikely to be the CO source.

In some implementations, after the control unit 130 turns off all combustion appliances, the control unit 130 may turn on combustion appliances individually and monitor CO to determine whether the combustion appliance just turned on increased CO. For example, the control unit 130 may first turn on a hot water heater, determine CO is not increasing, then turn on a cooking appliance, determine CO is increasing, and, in response, turn off the cooking appliance and indicate to a user that the cooking appliance is malfunctioning and is unsafe to use. In the example, the control unit 130 may continue turning on remaining combustion appliances to ensure that all the other combustion appliances are functioning correctly.

The control unit 130 may start with turning on combustion appliances that are considered most likely to have increased CO in the property 102. For example, the control unit 130 may determine that a CO sensor near the hot water heater indicated higher CO than a CO sensor near the cooking appliance and, in response, individually turn on the hot water heater first before turning on the cooking appliance. Accordingly, the control unit 130 may more quickly identify a source of the CO as the more likely sources would be checked first.

In some implementations, the control unit 130 may identify kitchen or bathroom vent fans that may lower CO in portions of the property 102. For example, the control unit 130 may determine that CO concentration may be lower in certain rooms than other rooms and identify a particular set of kitchen and bathroom vent fans that may be turned on to move CO from the rooms with higher CO concentration to the rooms with lower CO concentration. In some implementations, the control unit 130 may additionally take into consideration with rooms are occupied when moving CO between rooms. For example, the control unit 130 may determine that CO is lower in a room with a person and, in response, determine not to move CO from a room without a person to the room with the person even if the room without the person has a higher concentration of CO. In another example, the control unit 130 may determine that CO is lower in a room without a person and, in response, determine to move CO from a room with or without a person with a higher concentration of CO to the room without the person.

In some implementations, the system 200 may include a robotic device that may measure CO levels at different points in the property 102 where there are no CO sensors, identify where people might be, and open and close doors to control the flow of air through the property 102. For example, when a high CO reading is reported by a living room sensor, the robotic device may start in the living room, take a reading, then fly towards the bedrooms. If the CO levels drop off from the living room to the bedrooms, the robotic device may close doors to the bedrooms, and then go into the kitchen, etc., looking for higher and higher levels until the robotic device locates the likely source of the CO, which the control unit 130 may then deactivate.

Then the control unit 130 may determine a ventilation plan that would provide a path for airflow from the fresh air intake, through the effected rooms, to the exhaust vent. The control unit 130 may instruct the robotic device to open and close the necessary doors to effect this plan. The plan might include multiple steps, for example, venting different areas one at a time to avoid CO pooling in areas where airflow is low. During and after ventilation, the control unit 130 may use the robotic device to continue to monitor CO levels in various spots until the levels return to zero. If at any time levels of CO measured start to approach some fraction of the Lower Explosive Limit (LEL), the robotic device may retreat, unless it is rated for intrinsic safety in explosive environments.

Figure 3:
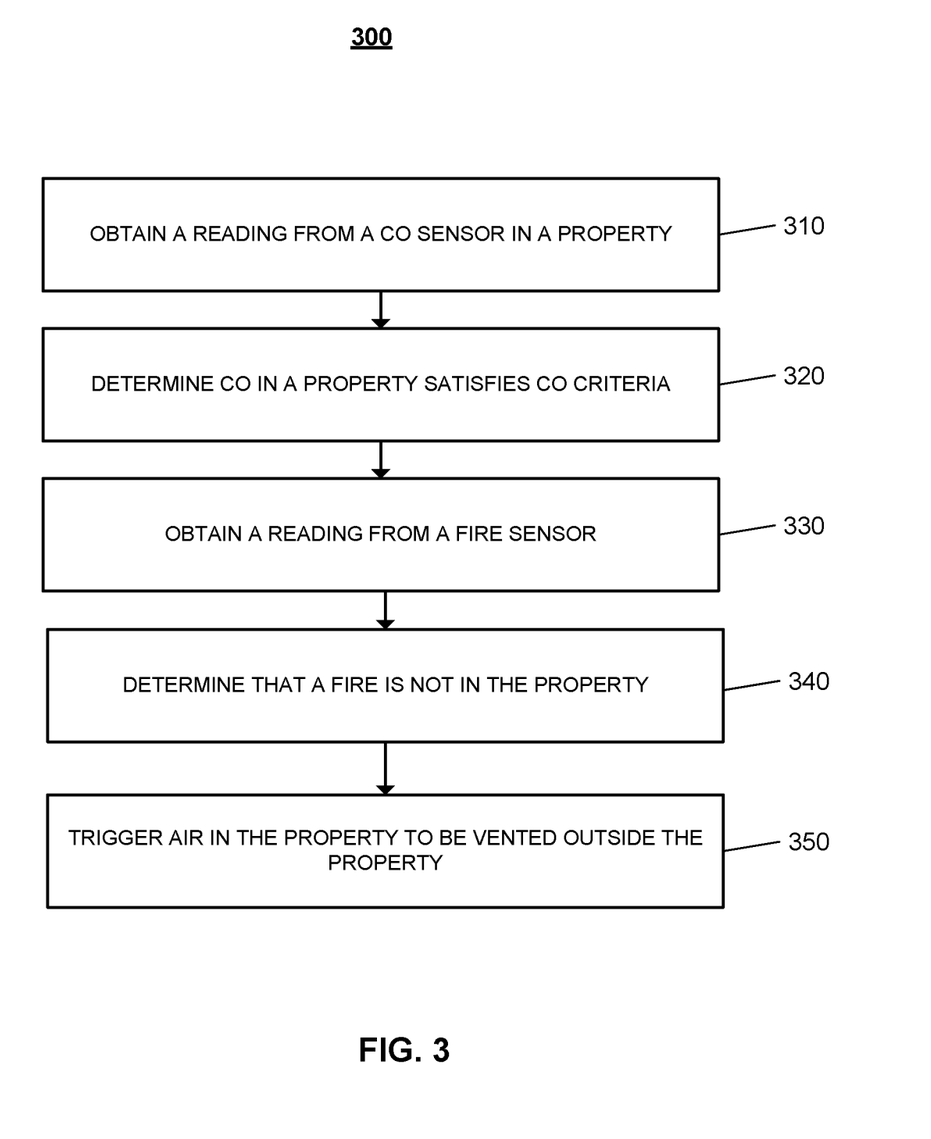
FIG. 3 is a flow chart of an example process for purging CO from within a property.

FIG. 3 is a flow chart of an example process 300 for purging CO from within a property. The process 300 may be performed by the systems 100 or 200, or some other system. Generally, the process 300 includes obtaining a reading from a CO sensor in a property (310), determining CO in a property satisfies CO criteria (320), obtaining a reading from a fire sensor (330), determining that a fire is not in the property (340), and triggering air in the property to be vented outside the property (350).

Describing in more detail, the process 300 includes obtaining a reading from a CO sensor in a property (310). In some implementations, obtaining a reading from a carbon monoxide sensor in a property includes obtaining, at a control unit in the property, an indication of a particular carbon monoxide concentration detected by the carbon monoxide sensor. For example, the control unit 130 may receive a reading of forty CO PPM from the CO sensor 110.

In another example, the control unit 130 may receive a reading of ten CO PPM from the CO sensor 110.

The process 300 includes determining CO in a property satisfies CO criteria (320). For example, the control unit 130 may determine that the reading of forty CO PPM satisfies the CO criteria of equal to or greater than twenty five CO PPM. In some implementations, determining that carbon monoxide in a property satisfies a carbon monoxide criteria includes determining that the concentration detected by the carbon monoxide sensor is above a particular safety threshold. For example, the control unit 130 may determine that the reading of forty CO PPM satisfies the CO criteria of greater than thirty CO PPM.

The process 300 includes obtaining a reading from a fire sensor (330). For example, the control unit 130 may obtain a reading of "no fire detected" from the fire sensor 120. In another example, the control unit 130 may obtain a reading of "fire detected." In some implementations, obtaining a reading from a fire sensor includes in response to determining that carbon monoxide in the property satisfies the carbon monoxide criteria, providing a request to the fire sensor for a status, and receiving the reading from the fire sensor in response to the request. For example, the reading from the fire sensor 120 may be obtained in response to the control unit 130 providing the fire sensor 120 a request for a reading, and the control unit 130 may provide the fire sensor 120 a request for a reading in response to determining that the CO in a property satisfies the CO criteria.

In some implementations, obtaining a reading from a fire sensor includes receiving the reading from the fire sensor before determining that carbon monoxide in the property satisfies the carbon monoxide criteria. For example, the control unit 130 may receive readings that are automatically sent by the fire sensor every ten seconds, minute, five minutes, or some other amount of time and not request the fire sensor 120 for a reading in response to determining CO in the property 102 satisfies CO criteria.

The process 300 includes determining that a fire is not in the property (340). For example, the control unit 130 may receive a reading of "no fire detected" and, in response, determine that no fire is in the property 102 based on the reading of "no fire detected." In another example, the control unit 130 may receive a reading of "fire detected" and, in response, determine that a fire is in the property 102 based on the reading of "fire detected." In some implementations, the control unit 130 may receive multiple readings from multiple fire sensors and determine no fire detected if all fire sensors provide a reading of "no fire detected." If any fire sensor provides a reading of "fire detected," the control unit 130 may then determine a fire is in the property 102.

The process 300 includes triggering air in the property to be vented outside the property (350). For example, the control unit 130 may trigger air in a building that is the property 102 to be vented outside the property 102. In some implementations, triggering air in the property to be vented outside the property includes providing an instruction to a HVAC system in the property that instructs the HVAC system to vent air outside the property. For example, the control unit 130 may provide an instruction to the HVAC system 140 to turn on fans that exhaust air outside the property 102.

In some implementations, triggering air in the property to be vented outside the property includes determining a path to vent carbon monoxide through the property and controlling vents in the property based on the path that was determined. For example, the control unit 130 may determine rooms that people are located in and vent carbon monoxide through the property so that the carbon monoxide in those rooms increases less than carbon monoxide in other rooms.

In some implementations, the process 300 includes determining that a second reading, from a second carbon monoxide sensor outside the property that includes the fire sensor, indicates that a concentration of carbon monoxide outside the building is lower than the concentration of carbon monoxide inside the property, where the property is a building, and where triggering air in the property to be vented outside the property is in response to determining that the second reading indicates that the concentration of carbon monoxide outside the building is lower than the concentration of carbon monoxide inside the building.

For example, the control unit 130 may determine that the reading of forty CO PPM satisfies the CO criteria of greater than thirty CO PPM, that a fire is not in the property, and that a reading of 10 CO PPM from the CO sensor 112 shows lower CO outside a building that includes the CO sensor 110 and, in response, trigger air in the building to be vented outside the building. In another example, the control unit 130 may determine that the reading of forty CO PPM satisfies the CO criteria of greater than thirty CO PPM, that a fire is not in the property, and that a reading of 50 CO PPM from the CO sensor 112 shows higher CO outside a building that includes the CO sensor 110 and, in response, not trigger air in the building to be vented outside the building as venting air would increase CO levels within the building.

In some implementations, determining that a second reading, from a second carbon monoxide sensor outside a building that includes the fire sensor, indicates that a concentration of carbon monoxide outside the building is lower than the concentration of carbon monoxide inside the building includes, in response to determining that carbon monoxide in the property satisfies the carbon monoxide criteria and that a fire is not in the property, providing a request to the second carbon monoxide sensor for a status and receiving the second reading from the second carbon monoxide sensor in response to the request. For example, control unit 130 may provide a request to the CO sensor 112 for a reading in response to determining that the reading of forty CO PPM satisfies the CO criteria of greater than thirty CO PPM and that a fire is not in the property 102.

Figure 4:
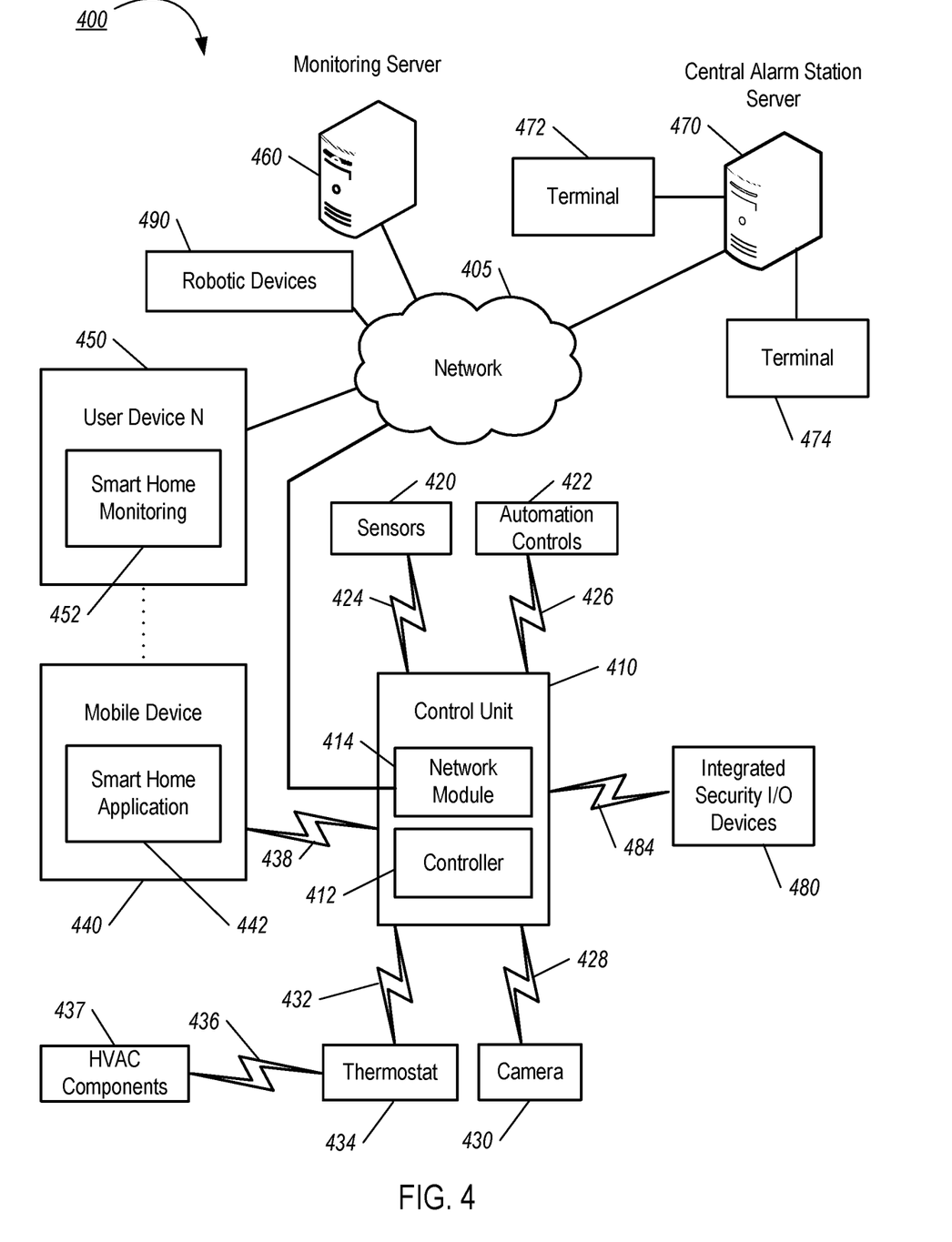
FIG. 4 is an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some implementations, the control unit 410 may perform the functions described for control unit 130 in FIG. 1. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data.

Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 may also be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 may also be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 may also include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 may also include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 may also include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 may also include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 may also receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 may also receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
obtaining a first reading from a first carbon monoxide sensor in a building;
determining that carbon monoxide in the building satisfies a carbon monoxide criteria based on the first reading from the first carbon monoxide sensor;
obtaining a reading from a fire sensor in the building;
determining that a fire is not in the building based on the reading from the fire sensor;
in response to determining that the carbon monoxide in the building satisfies the carbon monoxide criteria and that a fire is not in the building, determining that a second reading, from a second carbon monoxide sensor outside the building, indicates that a concentration of carbon monoxide outside the building is lower than the concentration of carbon monoxide inside the building; and
in response to determining that the second reading indicates that the concentration of carbon monoxide outside the building is lower than the concentration of carbon monoxide inside the building, triggering air in the building to be vented outside the building.

2. The method of claim 1, wherein obtaining the reading from the fire sensor comprises:
in response to determining that the carbon monoxide in the building satisfies the carbon monoxide criteria, providing a request to the fire sensor for a status; and
receiving the reading from the fire sensor in response to the request.

3. The method of claim 1, wherein obtaining the reading from the fire sensor comprises:
receiving the reading from the fire sensor before determining that carbon monoxide in the building satisfies the carbon monoxide criteria.

4. The method of claim 1, wherein determining that a fire is not in the building comprises:
determining that the reading indicates that no current fire was detected by the fire sensor.

5. The method of claim 1, wherein determining that the second reading, from the second carbon monoxide sensor outside the building, indicates that the concentration of carbon monoxide outside the building is lower than the concentration of carbon monoxide inside the building comprises:
in response to determining that the carbon monoxide in the building satisfies the carbon monoxide criteria and that a fire is not in the building, providing a request to the second carbon monoxide sensor for a status; and
receiving the second reading from the second carbon monoxide sensor in response to the request.

6. The method of claim 1, wherein obtaining the first reading from the first carbon monoxide sensor in the building comprises:
obtaining, at a control unit in the building, an indication of a particular carbon monoxide concentration detected by the first carbon monoxide sensor.

7. The method of claim 6, wherein determining that the carbon monoxide in the building satisfies the carbon monoxide criteria comprises:
determining that the concentration detected by the first carbon monoxide sensor is above a particular safety threshold.

8. The method of claim 1, wherein triggering the air in the building to be vented outside the building comprises:
providing an instruction to a heating, venting, and air conditioning (HVAC) system in the building that instructs the HVAC system to vent the air outside the building.

9. The method of claim 1, wherein triggering the air in the building to be vented outside the building comprises:
determining a path to vent the carbon monoxide through the building; and
controlling vents in the building based on the path that was determined.

10. The method of claim 1, comprising:
obtaining a third reading from a third carbon monoxide sensor that is closer to a combustion appliance than the first carbon monoxide sensor;
determining that the combustion appliance is likely producing the carbon monoxide based on the first reading and the third reading; and
in response to determining that the combustion appliance is likely producing carbon monoxide based on the first reading and the third reading, deactivating the combustion appliance.

11. A system comprising:
one or more computers and one or more storage devices storing instructions that are operable, when executed by the one or more computers, to cause the one or more computers to perform operations comprising:
obtaining a first reading from a first carbon monoxide sensor in a building;
determining that carbon monoxide in the building satisfies a carbon monoxide criteria based on the first reading from the first carbon monoxide sensor;
obtaining a reading from a fire sensor in the building;
determining that a fire is not in the building based on the reading from the fire sensor;
in response to determining that the carbon monoxide in the building satisfies the carbon monoxide criteria and that a fire is not in the building, determining that a second reading, from a second carbon monoxide sensor outside the building, indicates that a concentration of carbon monoxide outside the building is lower than the concentration of carbon monoxide inside the building; and
in response to determining that the second reading indicates that the concentration of carbon monoxide outside the building is lower than the concentration of carbon monoxide inside the building, triggering air in the building to be vented outside the building.

12. The system of claim 11, wherein obtaining the reading from the fire sensor comprises:
in response to determining that the carbon monoxide in the building satisfies the carbon monoxide criteria, providing a request to the fire sensor for a status; and
receiving the reading from the fire sensor in response to the request.

13. The system of claim 11, wherein obtaining the reading from the fire sensor comprises:
receiving the reading from the fire sensor before determining that carbon monoxide in the building satisfies the carbon monoxide criteria.

14. The system of claim 11, wherein determining that a fire is not in the building comprises:
determining that the reading indicates that no current fire was detected by the fire sensor.

15. The system of claim 11, wherein determining that the second reading, from the second carbon monoxide sensor outside the building, indicates that the concentration of carbon monoxide outside the building is lower than the concentration of carbon monoxide inside the building comprises:
in response to determining that the carbon monoxide in the building satisfies the carbon monoxide criteria and that a fire is not in the building, providing a request to the second carbon monoxide sensor for a status; and
receiving the second reading from the second carbon monoxide sensor in response to the request.

16. The system of claim 11, wherein obtaining the first reading from the first carbon monoxide sensor in the building comprises:
obtaining, at a control unit in the building, an indication of a particular carbon monoxide concentration detected by the first carbon monoxide sensor.

17. The system of claim 16, wherein determining that the carbon monoxide in the building satisfies the carbon monoxide criteria comprises:
determining that the concentration detected by the first carbon monoxide sensor is above a particular safety threshold.

18. A non-transitory computer-readable medium storing software comprising instructions executable by one or more computers which, upon such execution, cause the one or more computers to perform operations comprising:
obtaining a first reading from a first carbon monoxide sensor in a building;
determining that carbon monoxide in the building satisfies a carbon monoxide criteria based on the first reading from the first carbon monoxide sensor;
obtaining a reading from a fire sensor in the building;
determining that a fire is not in the building based on the reading from the fire sensor;
in response to determining that the carbon monoxide in the building satisfies the carbon monoxide criteria and that a fire is not in the building, determining that a second reading, from a second carbon monoxide sensor outside the building, indicates that a concentration of carbon monoxide outside the building is lower than the concentration of carbon monoxide inside the building; and
in response to determining that the second reading indicates that the concentration of carbon monoxide outside the building is lower than the concentration of carbon monoxide inside the building, triggering air in the building to be vented outside the building.

* * * * *

UNITED STATES PATENT AND TRADEMARK OFFICE
CERTIFICATE OF CORRECTION

PATENT NO. : 11,624,519 B2
APPLICATION NO. : 16/737124
DATED : April 11, 2023
INVENTOR(S) : Dana Eubanks, Andrew Scanlon and Donald Madden It is certified that error appears in the above-identified patent and that said Letters Patent is hereby corrected as shown below:

On the Title Page

Item [73] delete "Object Video" and insert -- ObjectVideo --.

Signed and Sealed this
Thirtieth Day of May, 2023

Katherine Kelly Vidal
*Director of the United States Patent and Trademark Office*